(12) United States Patent
Accetta (10) Patent No.: US 10,782,231 B2
(45) Date of Patent: Sep. 22, 2020

(54) OPTICAL IMMERSION REFRACTOMETER

(71) Applicant: Joseph Samuel Accetta, Albuquerque, NM (US)

(72) Inventor: Joseph Samuel Accetta, Albuquerque, NM (US)

(73) Assignee: Joseph Samuel Accetta, Albuquerque, NM (US)

(*) Notice: Subject to any disclaimer, the term of this patent is extended or adjusted under 35 U.S.C. 154(b) by 0 days.

(21) Appl. No.: 16/101,374

(22) Filed: Aug. 10, 2018

(65) Prior Publication Data

US 2020/0182786 A1 Jun. 11, 2020

Related U.S. Application Data

(63) Continuation-in-part of application No. 15/218,494, filed on Jul. 25, 2016, now Pat. No. 10,145,789.

(60) Provisional application No. 62/654,922, filed on Apr. 9, 2018.

(51) Int. Cl.
*G01N 21/41* (2006.01)
*G01M 11/02* (2006.01)

(52) U.S. Cl.
CPC ..... *G01N 21/4133* (2013.01); *G01M 11/0228* (2013.01)

(58) Field of Classification Search
CPC ................. G01N 21/4133; G01M 11/0228
See application file for complete search history.

(56) References Cited

FOREIGN PATENT DOCUMENTS

| EP | 3511699 A1 | * | 7/2019 | ......... G01N 21/4133 |
| SU | 757944 A1 | * | 8/1980 | ............ G01N 21/41 |
| SU | 1300346 A | * | 3/1987 | ............ G01N 21/43 |

* cited by examiner

*Primary Examiner* — Charlie Y Peng
(74) *Attorney, Agent, or Firm* — von Briesen & Roper, s.c.

(57) ABSTRACT

The present invention provides a device for measuring the absolute value of the refractive index of a liquid by immersion uses the optical properties of a cylindrical waveguide with a solid core and normal angle of incidence of the light source.

13 Claims, 6 Drawing Sheets

OPTICAL IMMERSION REFRACTOMETER

CROSS REFERENCE TO RELATED APPLICATIONS

This application claims priority as a continuation-in-part of U.S. application Ser. No. 15/218,494, "An Immersion Refractometer," filed Jul. 25, 2016, and claims priority to U.S. provisional 62/654,922, filed Apr. 9, 2018, each of which is incorporated herein by reference.

BACKGROUND OF THE INVENTION

The field of this invention is the measurement of the index of refraction of liquids. These instruments, known as refractometers, are of 4 main types: traditional handheld refractometers, digital handheld refractometers, laboratory or Abbe refractometers, and inline process refractometers. Although refractometers are typically used for measuring the refractive index of liquids, they can be used to measure gases and solids for example the Rayleigh Refractometer used (typically) for measuring the refractive indices of gases. Refractometers may be calibrated in other engineering units such as specific gravity for example because of the predictable relationship between refractive index and specific gravity in many liquid solutions.

Traditional hand held refractometers rely on the critical angle principle. When the critical angle of incident light on an interface is exceeded total reflection occurs. The refracted angle of incident light is a function of the angle of incidence and the index of refraction of the liquid to be measured and related through Snell's Law.

Handheld refractometers use a small quantity of liquid that is placed between a prism and a small cover plate. Light traveling through the sample is either passed through to the reticle or totally internally reflected. The net effect is that a shadow line forms between the illuminated area and the dark area. It is where this shadow line crosses the scale that a reading is taken. The prism projects a shadow line onto a small glass reticle inside the instrument. The reticle is then viewed by the user through a magnifying eyepiece. Certain digital versions of this technique rely on an array of photodetectors to measure the position of the shadow line.

The necessity of placing a small quantity of liquid inside the instrument is an impediment to convenient, rapid and safe measurement of liquids that in some cases may be hazardous such as acids. An instrument that can make the refractive index measurement by direct immersion in the container and is impervious to corrosive fluids would be both a considerable convenience and a safety measure and thus a need exists for such a device.

In the Abbe' refractometer the liquid sample is sandwiched into a thin layer between an illuminating prism and a refracting prism. Abbe' refractometers are most easily used for measuring the index of solids.

Process control refractometers are designed to monitor the refractive index under continuous flow conditions such as oil refining and various chemical processes. These refractometers rely on conventional fiber optics using the liquid as the cladding as described above and suffer from a number of shortcomings including susceptibility to corrosive liquids.

BRIEF SUMMARY OF THE INVENTION

The present invention provides a device for measuring the absolute value of the refractive index of a liquid by immersion uses the optical properties of a cylindrical waveguide with a solid core and normal angle of incidence of the light source. The principle of operation can be described by analogy to fiber optic light transmission whereby the relationship between the indices of refraction of the core ($n_{co}$) and cladding ($n_{cl}$) of the fiber for efficient propagation through the fiber is given as:

$$(n_{co}^2 - n_{cl}^2)^{1/2} > 1 \quad (1)$$

An example embodiment provides a device comprising a cylindrical non-conducting waveguide consisting of a transparent tube that transmits light along its axis by the process of total internal reflection similar to the mechanism at work in conventional multi-mode fiber optics. The surrounding liquid provides an external loss mechanism depending on its refractive index. As such the device is not strongly affected by particulate matter that may be present.

In the foregoing embodiment of the device, the liquid to be measured becomes the analog to the cladding of the fiber and the solid core of the waveguide is the analog to the core of the fiber. The index of the core is chosen for compatibility with the liquid to be measured to ensure efficient propagation. The configuration of the device is well suited to measure the refractive index of the surrounding liquid by immersion of the active region of the core. The active region on the core is surrounded by a transparent and impervious substance such as glass or quartz whose refractive index is considerably greater than the core material and thus does not affect the basic principle of propagation stated above. The length of the active core region must be sufficient to entertain measurable losses typically about 1" for many liquids.

Figure 1:
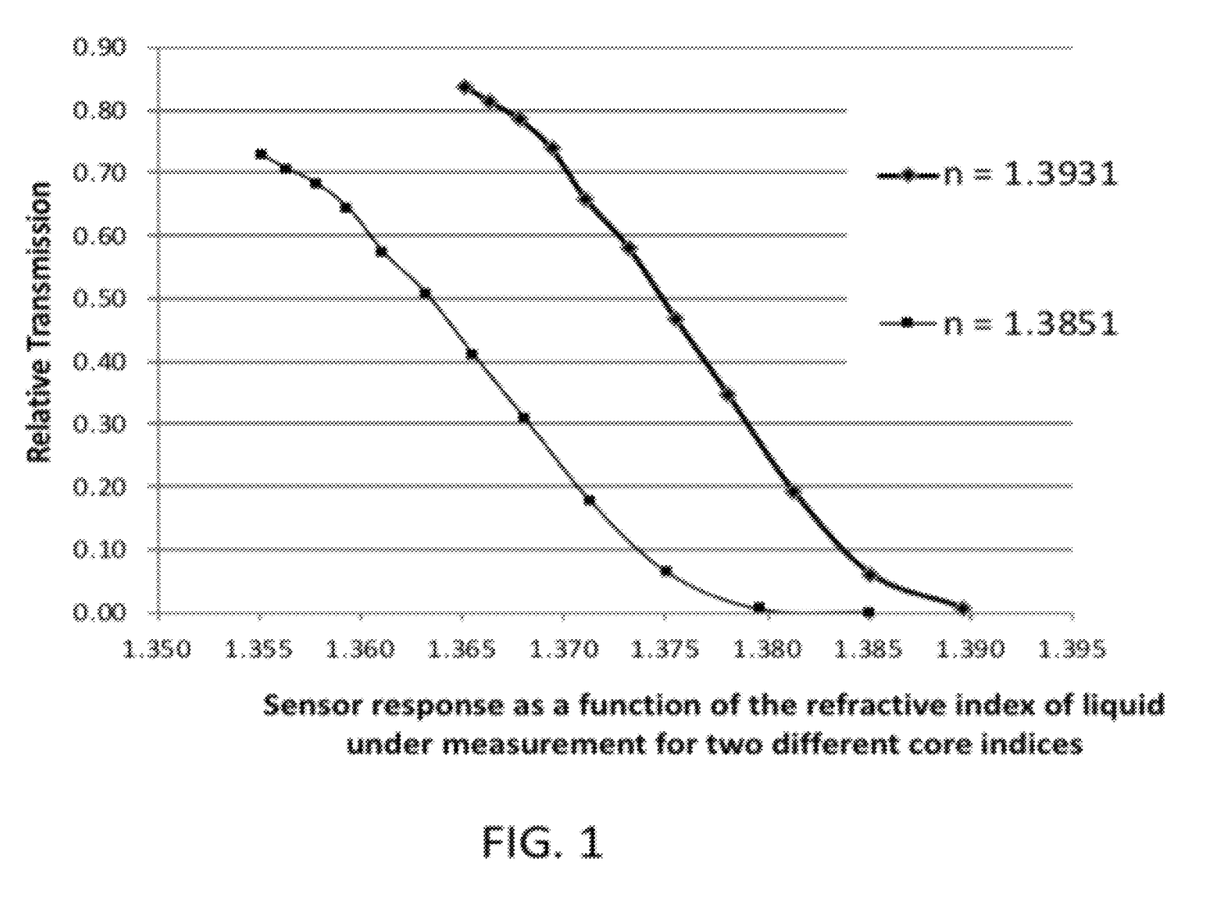
FIG. 1 is a graph of the response of the device as a function of the core index and surrounding liquid refractive index.

Although the relationship between the indices of the solid core and the surrounding liquid given by EQ. 1 appears to indicate a specific cutoff in efficient propagation of light when $n_{co} = n_{cl}$ in fact, the change in propagation efficiency as these two quantities approach each other is more gradual as shown in FIG. 1 where the response is shown for two core indices as a function of the surrounding liquid index. This graph demonstrates both the gradual decrease in transmission and the requirement to choose the core index to be compatible with the refractive index of the liquid to be measured. This decrease in transmission of the device as a function of surrounding liquid index is the basic principle of operation of this device.

EQ. 1 only indicates the condition for efficient transmission and does not indicate the relative degree of transmission. The actual degree of transmission is determined by the geometry of the active region including its length and diameter. In the case illustrated in FIG. 1, the diameter of the active region is 3 mm and the active length is 25 mm.

Embodiments of the present invention provide a refractometer that is suitable for immersion in a liquid to be measured thus overcoming certain limitations associated with existing devices. These limitations include the necessity for entry of the light at certain angles, the necessity for light to travel through the liquid, the necessity to use laser device in single mode operation or to use optical fibers that are subject to deterioration due to corrosive liquids or complex optical components. This invention utilizes the underlying physics of optical waveguide propagation to realize a device capable of measuring the refractive index of a liquid via direct immersion of the device in a container containing the liquid.

Because the degree of loss is a function is not only a function of the core and liquid indices but the length of the transmission path as well, the device may use a double pass arrangement to increase its basic sensitivity. This configuration is implemented with conventional optical fibers to input and output light from the device and a reflecting end mirror such that the incident light and reflected light enter and exit from the same end of the device facilitating measurement by immersion.

The device may be calibrated to measure absolute refractive index by referencing the voltage output of the photodetector to the known refractive index of calibration solutions.

DETAILED DESCRIPTION OF THE INVENTION

FIG. 1 is a graph of the response of the device as a function of the core index and surrounding liquid refractive index. This graph illustrates a general trend of performance and the requirement to "tune" the refractive index of the core for compatibility of the liquid indices to be measured. This figure represents phenomenological results supporting this invention.

An example configuration of the invention for the measurement of the refractive index of a liquid by immersion comprise:
(a) Light source such as a LED or laser;
(b) An optional fiber optic means of conveying the light source to the active material;
(c) A tube impervious to the surrounding liquid whose optical properties do not impact the basic operating principle of the device;
(d) An active length and diameter of the tube filled with a transparent solid of appropriate index;
(e) An optional end-mirror to reflect the light back toward the input increasing the effective length of the device;
(f) An optional fiber optic means of conveying the reflected light to a conventional photodetector;
(g) An optional thermistor or similar device embedded therein to sense the temperature of the liquid;
(h) A photodetector to convert the reflected light to a electrical signal; and
(i) A analysis system to convert said electrical signals into refractive index.

The performance of this device in terms of the signal loss during propagation is a function of tube material, core index, liquid index, tube diameter, tube length, wavelength of the incident light and the numerical aperture of the input source. As the surrounding liquid changes its refractive index the amount of power transmitted through the device changes accordingly thus illustrating the basic principle of operation.

The choice of the tube material is dependent on 3 properties: impervious to the surrounding liquid, the transparency of good quality glass, and of refractive index such that the tube does not impact the basic performance expressed by Eq. 1. This latter property is achieved by choosing a refractive index that is much greater than the core index such as glass, pyrex or preferably quartz with index ≈1.54 at 590 nm. With a tube material index much greater than the core index the conditions for confined rays expressed by Eq. 1 are violated and the tube becomes totally transparent in a waveguide sense relying only on the liquid index to determine the propagation characteristics.

The choice of tube length depends on the tolerable signal loss and the tube diameter. Longer tubes yield more loss because the incident light undergoes more reflections as the light propagates down the tube. The preferred embodiment yields an effective tube length of approximately 2". Length acts in consonance with tube diameter to yield the actual loss as a function of the surrounding liquid index.

The choice of tube diameter is a function of the numerical aperture of the tube input fiber combination. In the configuration above the core region will only propagate light that enters the tube within a certain cone known as the acceptance angle. Eq. 1 can be re-expressed as $$n \sin \theta_{max} = \sqrt{n_{co}^2 - n_{cl}^2} \qquad (2)$$

where n is the refractive index of the entry medium, $n_{co}$ is the refractive index of the core, and $n_{cl}$ is the refractive index of the cladding as before.

Light entering the core at angles greater than $\sin \theta_{max}$ will not undergo total reflection and thus those rays will not be transmitted through the core of the device. In this form, the quantity $n \sin \theta_{max}$ is defined as the numerical aperture (NA) of the system. The number of reflections that a ray undergoes as it traverses the tube is a function of the tube diameter. For a given NA of the entry fibers, larger diameter tubes yield fewer reflections and less loss during propagation.

The number of modes supported by a cylindrical waveguide or optical fiber is proportional to the diameter D of the fiber and given as:

$$N = \frac{\pi D}{\lambda} \sqrt{n_{co}^2 - n_{cl}^2} \qquad (3)$$

where λ is the wavelength of light.

The more modes a waveguide is capable of supporting the more power is transported from a multi-mode source.

Figure 3:
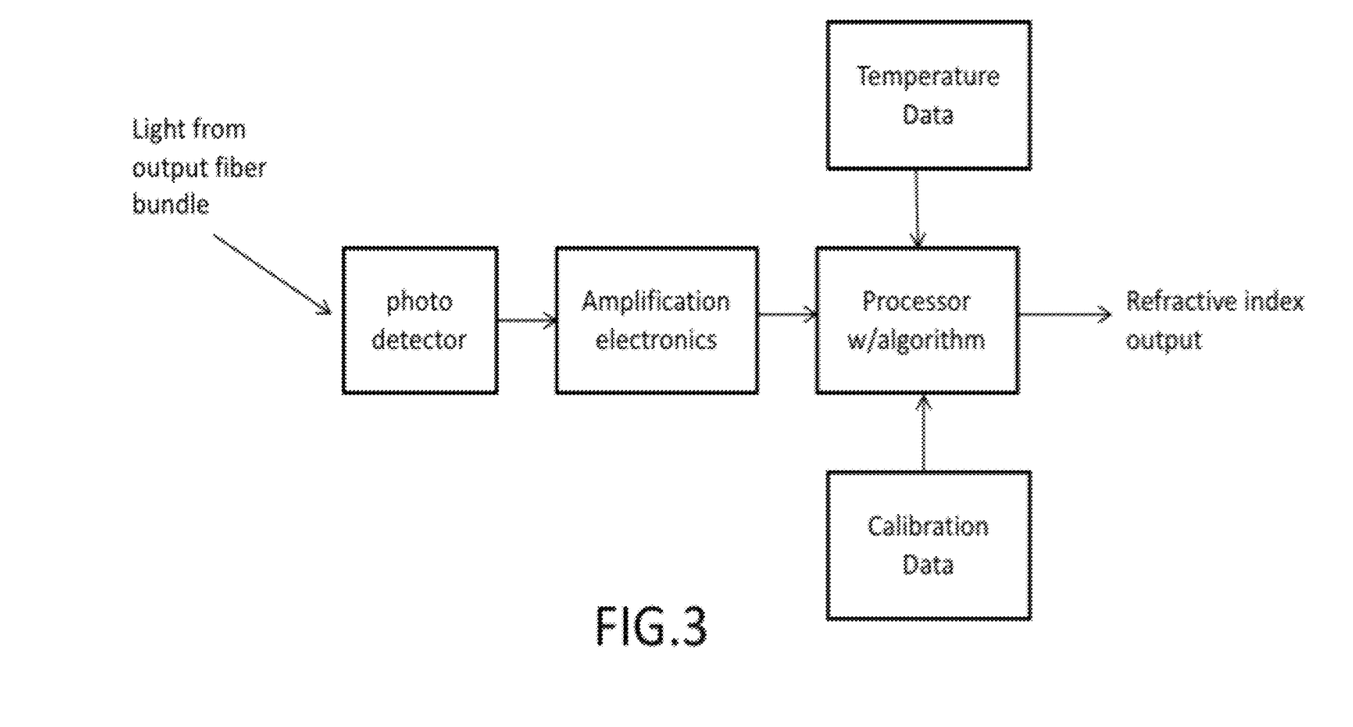
FIG. 3 is a schematic illustration of an analysis system.

For a given index of core material, the tube length and diameter work in consonance to yield a certain loss per unit length. There are no reliable analytical predictions of this relationship however in the preferred embodiment of this device with a core material index of 1.38, a tube length of 25 mm and a core diameter of 2 mm yields excellent performance over a liquid index An analysis system includes a model relating a signal from the detector to the index of refraction of the liquid as shown in FIG. 3.

Figure 2:
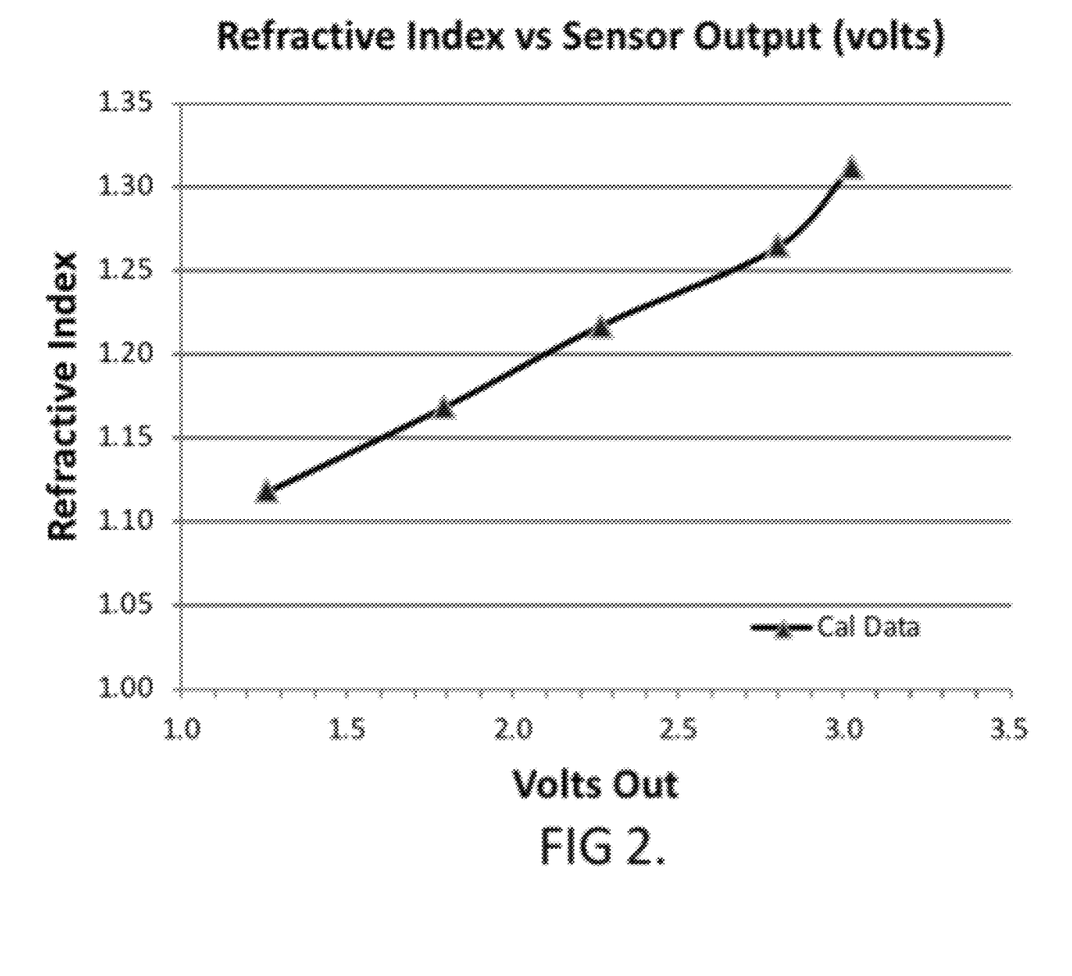
FIG. 2 is an illustration of calibration of an example embodiment.

The device may be calibrated as shown in FIG. 2 in terms absolute value of the refractive index or other engineering units related to refractive index by using a series of standard calibration solutions and a curve fitting algorithm such as a polynomial fit to yield accurate values of the units as a function of the output voltage of the photodetector. This technique circumvents such problems as dispersion effects due to the use of differing light source wavelengths.

Figure 4:
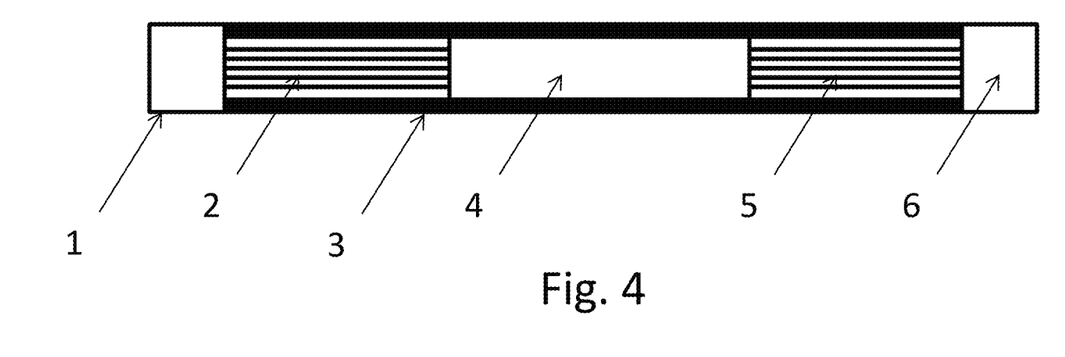
FIG. 4 shows an example embodiment comprising a device for the quantitative measurement of the refractive index of a liquid.

Example Embodiment 1. A device for the quantitative measurement of the refractive index of a liquid shown in FIG. 4 and comprising:
(a) a light source 1 configured to produce light with an illumination wavelength supported by commercial glass or plastic optical components of wavelength 400 to 1300 nm;
(b) a illumination fiber optic bundle 2 comprising a single or plurality of optical fibers, said illumination fiber bundle having first and second ends, such that light from the light source is communicated to the first end of the illumination fiber bundle; said fiber bundle then communicating light to the first end of the core material
(c) a measuring tube 3 having first and second ends, comprising a material that is impervious to the liquid to be measured with a refractive index that is much greater than the core material;
(d) a core material 4 comprising the core of the measuring tube that is transparent to light at the illumination wavelength; with a refractive index approximately equal to the largest refractive index expected of the liquid to be measured and disposed within the measuring tube;
(f) a detection fiber bundle 5, having first and second ends, comprising a single or a plurality of optical fibers, mounted within the measuring tube such that light is communicated between the second end of the core material and the first end of the detection fiber bundle; said fiber bundle then communicating the light to the light detector.
(g) a light detector 6 configured to produce an electrical signal responsive to the intensity of light at the illumination wavelength, mounted with the detection fiber bundle such that light is communicated from the second end of the detection fiber bundle to the light detector.

In the example embodiment, the light detector signal can comprise an electrical signal, and wherein the device further comprises a temperature sensor configured to determine the temperature of the liquid.

In the example embodiment, an analysis system shown in FIG. 3 can be configured to determine the refractive index of the liquid to be measured consisting of a model relating the intensity of light detected and the liquid temperature to the refractive index of the liquid to be measured.

Figure 5:
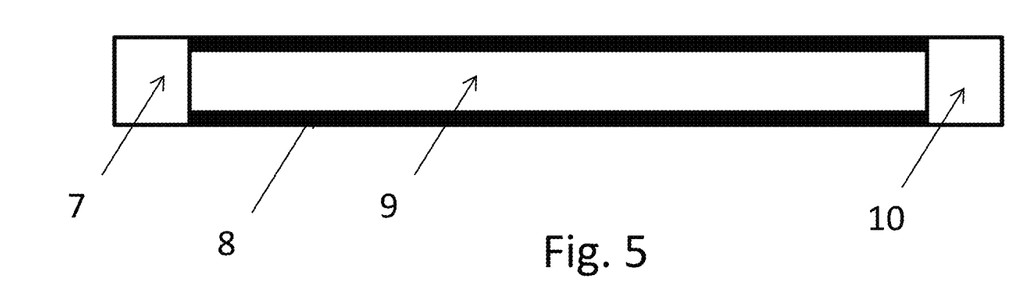
FIG. 5 shows an example embodiment comprising a device for the quantitative measurement of the refractive index of a liquid.

Example embodiment 2. A device for the quantitative measurement of the refractive index of a liquid as shown in FIG. 5 and comprising:
(a) a light source 7 configured to produce light with an illumination wavelength supported by commercial glass or plastic optical components of wavelength 400 to 1300 nm mounted within the first end of the measuring tube and in contact with the core material.
(b) a measuring tube 8 having first and second ends, comprising a material that is impervious to the liquid to be measured that has a refractive index that is much greater than the core material;
(c) a core material 9 comprising the core of the measuring tube having first and second ends that is transparent to light at the illumination wavelength and has a refractive index approximately equal to the largest refractive index expected of the liquid to be measured disposed within the measuring tube;
(d) A light detector 10 configured to produce an electrical signal responsive to the intensity of light at the illumination wavelength mounted within the first end of the transparent tube and in contact with the second end of the core material.

In the example embodiment 2, the light detector signal can comprise an electrical signal, and wherein the device further comprises a temperature sensor configured to determine the temperature of the liquid.

In the example embodiment 2, an analysis system as shown in FIG. 3; said system configured to determine the refractive index of the liquid to be measured; said system consisting of a model relating the intensity of light detected and said system optionally using the liquid temperature to determine the refractive index of the liquid to be measured.

Figure 6:
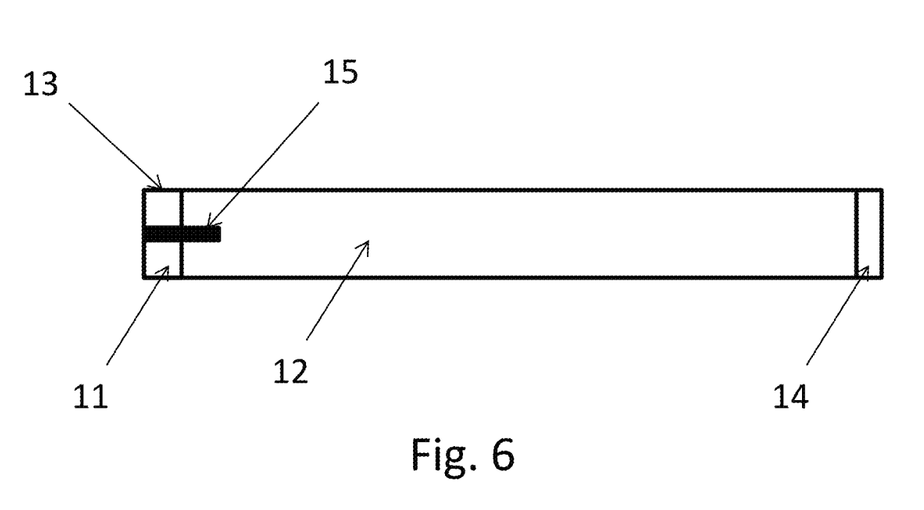
FIG. 6 shows an example embodiment comprising a device for the quantitative measurement of the refractive index of a liquid.

Example embodiment 3. A device for the quantitative measurement of the refractive index of a liquid as shown in FIG. 6 comprising:
(a) a light source 11 configured to produce light with an illumination wavelength supported by commercial glass or plastic optical components of wavelength 400 to 1300 nm
(c) said light source mounted at the first end and in contact with the material of the tube (c) a solid tube 12 having first and second ends, comprising a material that is transparent at the illumination wavelength
(d) said solid tube impervious to the liquid to be measured with a refractive index that is approximately equal to the largest refractive index expected of the liquid to be measured
(e) a light detector 13 configured to produce an electrical signal responsive to the intensity of light at the illumination wavelength;
(f) said light detector mounted in contact with the first end of the solid tube
(g) a mirror 14 mounted at the second end of the solid tube such that light propagating through the transparent tube to the second end thereof is reflected by the mirror into the transparent tube toward the first end thereof.

In the example embodiment, the light detector signal can comprise an electrical signal, and wherein the device further comprises a temperature sensor configured to determine the temperature of the liquid.

In the example embodiment 3, an analysis system as shown in FIG. 3; said system configured to determine the refractive index of the liquid to be measured; said system consisting of a model relating the intensity of light detected and said system optionally using the liquid temperature to determine the refractive index of the liquid to be measured.

An example embodiment can comprise a light baffle 15 between the light source and detector.

The present invention has been described as set forth herein in relation to various example embodiments and design considerations. It will be understood that the above description is merely illustrative of the applications of the principles of the present invention, the scope of which is to be determined by the claims viewed in light of the specification. Other variants and modifications of the invention will be apparent to those of skill in the art.

I claim:

1. A device for quantitatively measuring the refractive index of a liquid comprising:
   (a) a light source configured to produce light with an illumination wavelength from 400 nm to 1300 nm;
   (b) a measuring tube having first and second ends, comprising a material that is impervious to the liquid and that has a refractive index that is much greater than the refractive index of the liquid;
   (b) a core material disposed in the core of the measuring tube comprising a material that is a transparent to light at the illumination wavelength and has a refractive index approximately equal to or greater than the refractive index of the liquid, disposed within the measuring tube;
   (d) an illumination fiber bundle comprising one or more optical fibers, said illumination fiber bundle having first and second ends, and mounted with the light source such that light from the light source is communicated to the first end of the illumination fiber bundle and mounted with the measuring tube such that light is communicated between the second end of the illumination fiber bundle and the core material;

(e) a detection fiber bundle, having first and second ends, comprising one or more optical fibers, mounted with the measuring tube such that light is communicated between the first end of the measuring tube and the first end of the detection fiber bundle;

(f) a light detector configured to produce a signal responsive to the intensity of light at the illumination wavelength, mounted with the detection fiber bundle such that light is communicated between the second end of the detection fiber bundle and the light detector;

(g) an analysis system configured to determine the refractive index of the liquid responsive to the signal.

2. The device of claim 1 wherein the refractive index of the-core material is equal to or exceeds the upper limit of the refractive index range of the liquid.

3. The device of claim 1, further comprising a temperature sensing element mounted with device such that the temperature sensing element is responsive to a liquid in contact with the portion of the measuring tube containing the core material, and wherein the analysis system is configured to determine the refractive index of the liquid responsive to the signal and to the sensed temperature.

4. The device of claim 1, wherein the light detector signal comprises an electrical signal, and wherein the device further comprises a temperature sensor configured to determine the temperature of the liquid, and wherein the analysis system comprises:
(h) signal conditioning electronics configured to amplify the electrical signal;
(i) a model relating intensity of light detected and liquid temperature to refractive index of a liquid surrounding the potion of the measuring tube containing the measurement material.

5. A device for quantitatively measuring the refractive index of a liquid comprising:
(a) a measuring tube having first and second ends, comprising a material that is impervious to the liquid and that has a refractive index that is much greater than the refractive index of the liquid;
(b) a core material disposed in the core of the measuring tube comprising a material that is a transparent to light at the illumination wavelength and has a refractive index approximately equal to or greater than the refractive index of the liquid, disposed within the measuring tube;
(c) a light source configured to produce light with an illumination wavelength from 400 nm to 1300 nm and mounted with the measuring tube such that light is communicated between the light source and a first end of the measuring tube;
(d) a light detector configured to produce a signal responsive to the intensity of light at the illumination wavelength, mounted with the measuring tube such that light is communicated between the second end of the measuring tube and the light detector;
(e) an analysis system configured to determine the refractive index of the liquid responsive to the signal.

6. The device of claim 5 wherein the refractive index of the-core material is equal to or exceeds the upper limit of the refractive index range of the liquid.

7. The device of claim 5, further comprising a temperature sensing element mounted with device such that the temperature sensing element is responsive to a liquid in contact with the portion of the measuring tube containing the core material, and wherein the analysis system is configured to determine the refractive index of the liquid responsive to the signal and to the sensed temperature.

8. The device of claim 5, wherein the light detector signal comprises an electrical signal, and wherein the device further comprises a temperature sensor configured to determine the temperature of the liquid, and wherein the analysis system comprises:
(j) signal conditioning electronics configured to amplify the electrical signal;
(k) a model relating intensity of light detected and liquid temperature to refractive index of a liquid surrounding the potion of the measuring tube containing the measurement material.

9. A device for quantitatively measuring the refractive index of a liquid comprising:
(a) a measuring tube having first and second ends, comprising a material that is impervious to the liquid and that has a refractive index that is much greater than the refractive index of the liquid;
(b) a core material disposed in the core of the measuring tube comprising a material that is a transparent to light at the illumination wavelength and has a refractive index approximately equal to or greater than the refractive index of the liquid, disposed within the measuring tube;
(c) a reflective element mounted with the second end of the measuring tube such that light directed out of the second end of the measuring tube is reflected into the measuring tube;
(d) a light source configured to produce light with an illumination wavelength from 400 nm to 1300 nm and mounted with the measuring tube such that light is communicated between the light source and a first end of the measuring tube;
(e) a light detector configured to produce a signal responsive to the intensity of light at the illumination wavelength, mounted with the measuring tube such that light is communicated between the first end of the measuring tube and the light detector;
(e) an analysis system configured to determine the refractive index of the liquid responsive to the signal.

10. The device of claim 9 wherein the refractive index of the-core material is equal to or exceeds the upper limit of the refractive index range of the liquid.

11. The device of claim 9, further comprising a temperature sensing element mounted with device such that the temperature sensing element is responsive to a liquid in contact with the portion of the measuring tube containing the core material, and wherein the analysis system is configured to determine the refractive index of the liquid responsive to the signal and to the sensed temperature.

12. The device of claim 9, wherein the light detector signal comprises an electrical signal, and wherein the device further comprises a temperature sensor configured to determine the temperature of the liquid, and wherein the analysis system comprises:
(j) signal conditioning electronics configured to amplify the electrical signal;
(k) a model relating intensity of light detected and liquid temperature to refractive index of a liquid surrounding the potion of the measuring tube containing the measurement material.

13. The device of claim 9, further comprising a light baffle mounted with the measuring tube such that light from the light source is discouraged from communicating directly with the light detector.

* * * * *